US012779842B2

(12) United States Patent
James

(10) Patent No.: US 12,779,842 B2
(45) Date of Patent: Nov. 3, 2026

(54) PRINTING BOARD TEMPERATURE INDICATOR

(71) Applicant: Packaging Materials Incorporated, Noblesville, IN (US)

(72) Inventor: Andrew Martin James, Noblesville, IN (US)

(73) Assignee: PACKAGING MATERIALS INCORPORATED, Noblesville, IN (US)

( * ) Notice: Subject to any disclaimer, the term of this patent is extended or adjusted under 35 U.S.C. 154(b) by 0 days.

(21) Appl. No.: 18/887,212

(22) Filed: Sep. 17, 2024

(65) Prior Publication Data

US 2026/0070326 A1 Mar. 12, 2026

Related U.S. Application Data

(60) Provisional application No. 63/692,871, filed on Sep. 10, 2024.

(51) Int. Cl.
*B41F 33/02* (2006.01)
*B41F 15/36* (2006.01)

(52) U.S. Cl.
CPC .............. *B41F 33/02* (2013.01); *B41F 15/36* (2013.01)

(58) Field of Classification Search
CPC ................................ B41F 33/02; B41F 15/36
USPC .......................................................... 156/378
See application file for complete search history.

(56) References Cited

U.S. PATENT DOCUMENTS

| | | | |
|---|---|---|---|
| 7,429,414 B2 | 9/2008 | Nagae | |
| 11,141,319 B2 | 10/2021 | Doshi | |
| 2024/0185743 A1 * | 6/2024 | Ambartsoumian | B41M 5/323 |

FOREIGN PATENT DOCUMENTS

| | | |
|---|---|---|
| BR | 102012022021 A2 | 10/2014 |
| CN | 208292912 U | 12/2018 |
| WO | WO 2019228792 A1 | 12/2019 |

OTHER PUBLICATIONS

Machine translation of BR102012022021A2 by PatDocs PDF Export on Sep. 3, 2024 (pp. 13).
Machine translation of CN208292912U by PatDocs PDF Export on Sep. 3, 2024 (pp. 6).

* cited by examiner

*Primary Examiner* — James D Sells
(74) *Attorney, Agent, or Firm* — James R. Blaufuss

(57) ABSTRACT

A tape used with a printing board or a printing board that includes a thermochromic pigment layer, wherein, when the thermochromic pigment layer is below a temperature, the thermochromic pigment layer is opaque and has a first appearance, and wherein, when the thermochromic pigment layer is above the temperature, the first thermochromic pigment layer is translucent or transparent, an opaque layer is positioned below the thermochromic pigment layer so that thermochromic pigment layer obscured the opaque layer when below the first temperature.

13 Claims, 8 Drawing Sheets

PRINTING BOARD TEMPERATURE INDICATOR

CROSS-REFERENCE TO RELATED APPLICATIONS

This application claims the benefit of U.S. Provisional Application No. 63/692,871, filed Sep. 10, 2024, which is hereby incorporated by reference.

BACKGROUND

This disclosure relates to the field of printing.

Screen printing is a printing technique where ink is transferred through a mesh screen. Multiple colors can be screen printed by using multiple screens, each only applying the particular colored portion of the design, with the final image being created using multiple partial images. Generally, the article being printed on is held in place on a print board and the multiple screen printing are sequentially performed. A partial image can be flash dried with the brief application of heat to partially cure an ink application between screen printings. In some cases, flash drying heats up the print board. It can be useful to keep the print board at a consistent temperature so that ink consistently flows through the screens. At lower temperature, ink may flow less freely, at higher temperatures, ink may flow more easily. Changing board temperatures can result in inconsistent print quality.

To address this, screen printers can cycle screen printing boards through flash drying heaters to preheat the boards prior to applying ink. Board temperatures can be verified using a thermometer, or equipment can be run for a set time prior to printing known to usually bring the printing boards up to temperature.

DETAILED DESCRIPTION OF THE DRAWINGS

Figure 1:
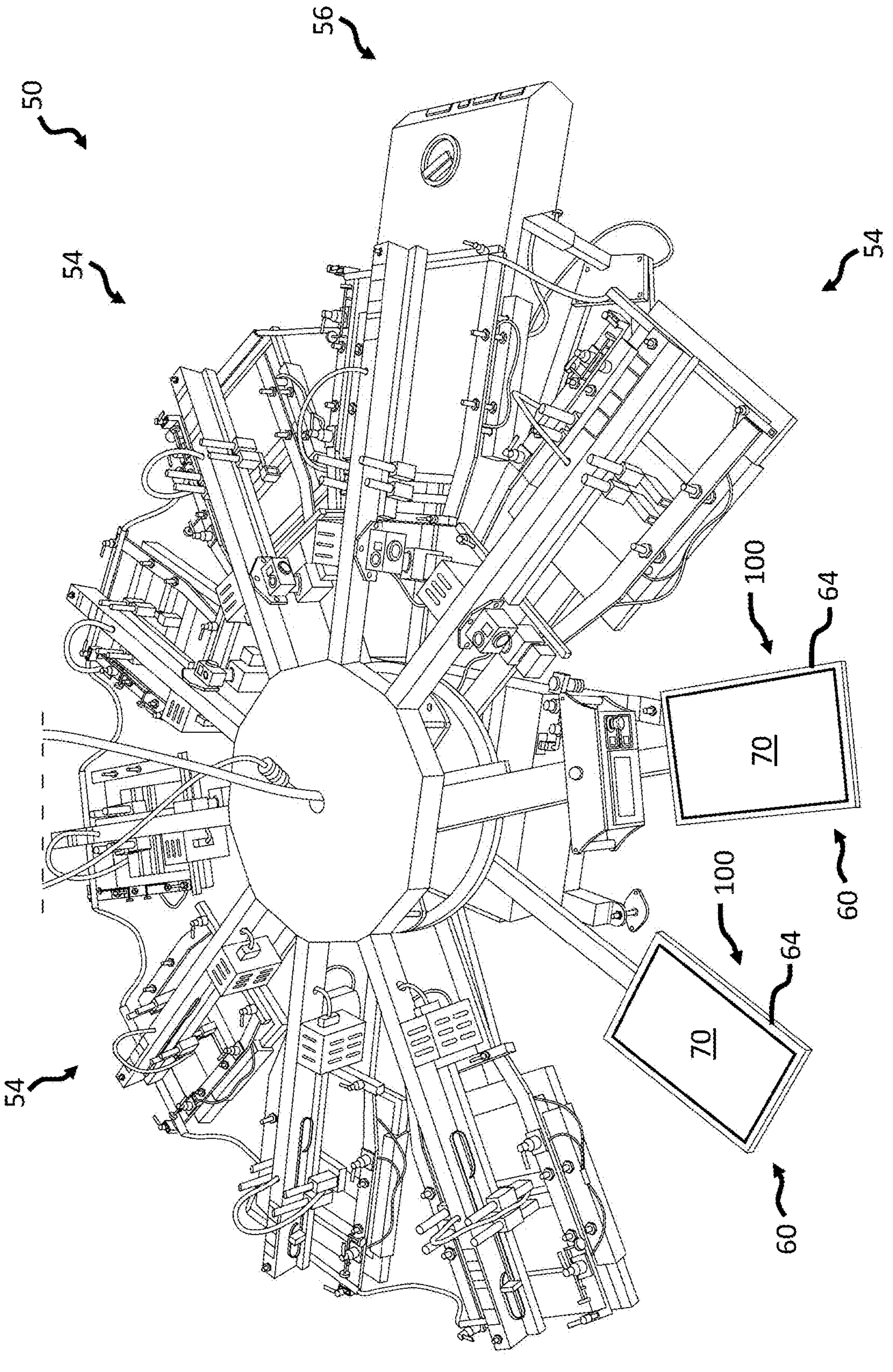
FIG. 1 is a perspective view of an example screen printing system.

For the purpose of promoting an understanding of the principles of the claimed invention, reference will now be made to the embodiments illustrated in the drawings and specific language will be used to describe the same. It will nevertheless be understood that no limitation of the scope of the claimed invention is thereby intended. Any alterations and further modifications in the described embodiments, and any further applications of the principles of the claimed invention as described herein are contemplated as would normally occur to one skilled in the art to which the claimed invention relates. Embodiments of the claimed invention are shown in detail, although it will be apparent to those skilled in the relevant art that some features that are not relevant to the present claimed invention may not be shown for the sake of clarity.

With respect to the specification and claims, it should be noted that the singular forms "a", "an", "the", and the like include plural referents unless expressly discussed otherwise. As an illustration, references to "a device" or "the device" include one or more of such devices and equivalents thereof. It also should be noted that directional terms, such as "left", "right", "up", "down", "top", "bottom", and the like, are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

Referring to FIG. 1, a printing system 50 is generally configured to print designs on clothing, textile fabrics, signs, and/or other objects. For example, printing system 50 can be used for screen printing. Printing system 50 typically includes one or more printing stations 54 and heating stations 56. At printing stations 54, printing system 50 applies ink to a substrate, such as a t-shirt or a sweatshirt as examples, to create all or part of a design. At heating stations 56, printing system 50 applies heat to the substrate, such as to prepare the substrate to receive the ink and/or to flash cure the ink on the substrate.

Printing system 50 includes one or more board assemblies 60. Board assembly 60 generally holds a substrate in place during printing and heating steps. In one example, printing system 50 can be arranged in carousel-style layout, with printing stations 54 and heating stations 56 positioned along a circular path, and board assemblies 60 rotating along that path to carry the substrate to each station. Alternatively, printing system 50 could be arranged in another layout.

Figure 2:
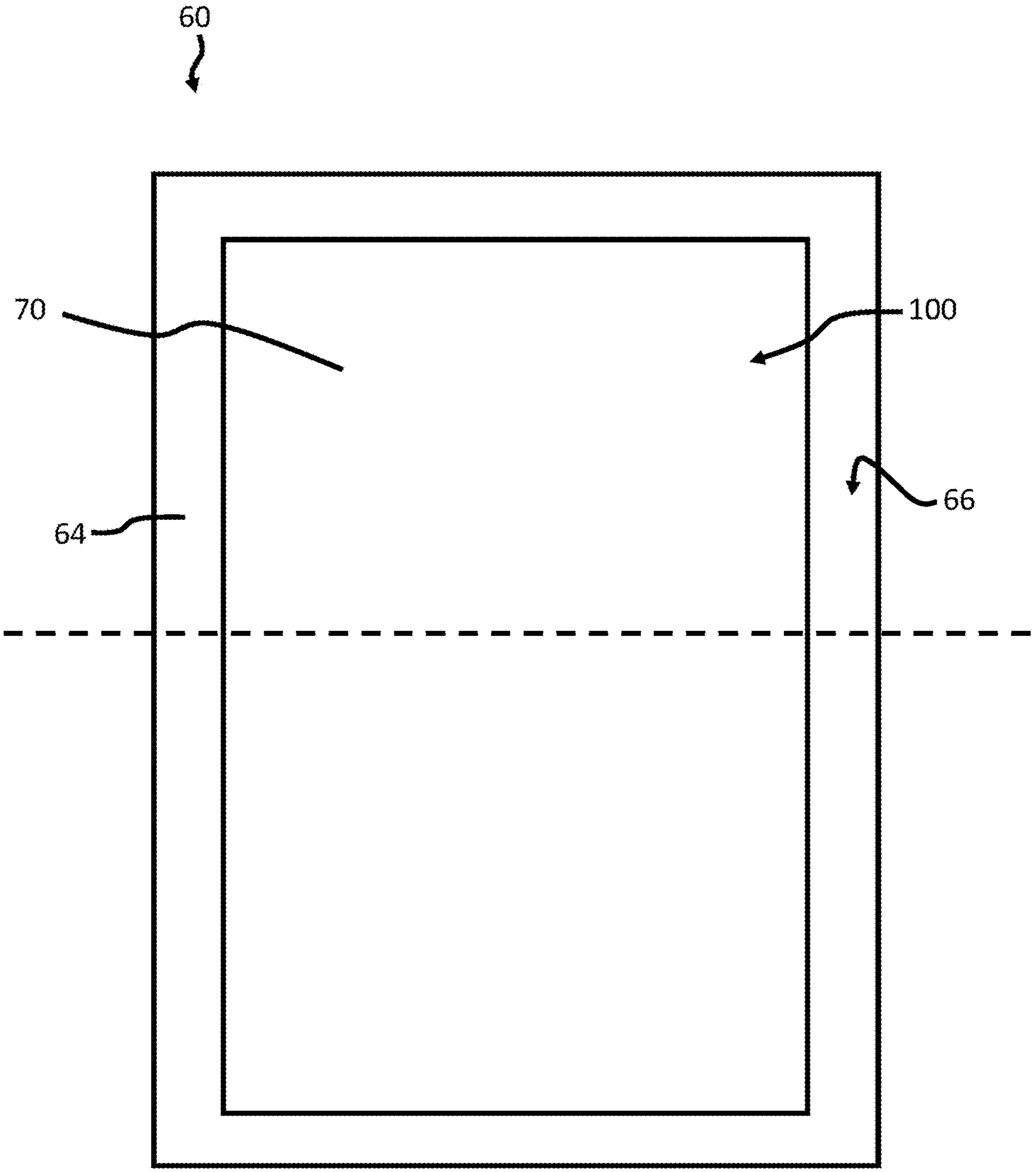
FIG. 2 is a top plan view of a board assembly, a part of the FIG. 1 screen printing system.

As shown in FIGS. 1 and 2, board assembly 60 typically includes a board 64, a tape pad 70, and a thermochromic indicator. Board 64 provides structural support for a substrate during the printing and heating processes. Board 64 may also provide alignment for printing stations so that ink is consistently applied in the same relative location. Tape pad 70 secures the substrate in position on the board 64 during such processes and retains the substrate in position during multiple printing steps so that subsequent printing images are aligned relative to each other. Tape pad 70 may include an adhesive that secures the substrate in position during printing and also enables garments or other substrates to be removed from tape pad 70 after printing and curing. The adhesive can then attach to a new substrate after the previous one is removed.

The thermochromic indicator generally provides feedback about the temperature of board assembly 60 and the substrate. The thermochromic indicator is configured to change color in response to changes in temperature, such as when the temperature exceeds a threshold value. Specifically, the thermochromic indicator is configured to turn translucent when above a particular temperature, such that below the particular temperature the thermochromic indicator is visible and displays a particular color and/or pattern. Then when above the particular temperature, the thermochromic indicator is translucent and a display layer positioned under the thermochromic indicator layer is visible. So long as the display layer is visually different in some way than the thermochromic layer, the thermochromic layer provides a visual indication of temperature, either above or below the particular temperature.

In many types of printing, the board assemblies are maintained above a desired minimum temperature to ensure that ink consistently transfers to the substrate and/or that ink cures properly after being applied to the substrate. For example, it is common to run a screen printing device with the heaters only at start up to bring the board assemblies up to the desired operating temperature before applying ink. By changing the appearance of board assembly 60, thermochromic indicator can alert users when temperatures are above a desired temperature. The thermochromic indicator can allow users to pause printing if the temperature of board assembly 60 drops below the desired minimum to ensure consistent print quality from printing system 50. Optionally, as described below, a separate thermochromic indicator can also be used to alert users of unsafe conditions, such as if the temperature is above a maximum temperature.

The thermochromic indicator can be integrated within tape pad 70, integrated directly on board 64, or applied on top of board 64 as a separate removable application positioned below tape pad 70. The thermochromic indicator can include one or more layers of a thermochromic paint. In one example, thermochromic indicator is in the form of a separate sheet of tape that is applied to board 64. In such an example, tape pad 70 can be translucent or fully transparent, and tape pad 70 can be applied on top of the thermochromic sheet of tape.

The thermochromic indicator includes one or more thermochromic pigments that change color based on temperature. For example, the thermochromic pigment can be a Leuco dye or include liquid crystals. In a preferred embodiment, the thermochromic pigment is translucent or fully transparent when above a particular temperature and opaque with a color when below the particular temperature. For example, the thermochromic pigment can change appearance at 90 degrees F., 120 degrees F., 180, degrees F., and/or another temperature. In another example, the thermochromic pigment changes color over a range of temperatures. For instance, the thermochromic dye can change color over a smaller temperature range centered around a target temperature, such as over a 5 or 10 degree range centered at 120 degrees F. as examples.

As shown in FIG. 2, board 64 is illustrated having a generally rectangular shape. Board 64 includes a printing surface 66 with tape pad 70 attached to board 64. In one embodiment, printing surface 66 is on a top side of board 64 that faces upwards. As should be appreciated, board 64 could be oriented in a variety of ways, and printing surface 66 could face a direction different than up. In the illustrated embodiment, printing surface 66 is generally uniform and flat across board 64. For example, board 64 can utilize a traditional flat and rectangular shape used for printing on t-shirts and other garments. In an alternate embodiment, printing surface 66 can be irregular and/or curved, such as to support printing on a specific shape of substrate and/or using a specific shape of equipment at printing station 54 and/or heating station 56.

Tape pad 70 is generally shaped to cover printing surface 66 of board 64. Tape pad 70 can cover all or part of top surface 66. In the illustrated example, tape pad 70 covers nearly all of printing surface 66 but does not cover the exterior edges of top surface 66. For instance, in one example, board 64 defines a 16-inch by 22-inch area, and tape pad 70 covers a 15.5-inch by 21-inch area on board 64. In another example, tape pad 70 covers at least 90% of printing surface 66. The thermochromic indicator can extend across the entire area of top surface 66, the same area as tape pad 70, or just a portion of board 64. Tape pad 70 can be pre-shaped into rectangular pads. Alternatively, tape pad 70 can be supplied as a roll that allows users to cut tape pad 70 to a desired dimension.

Figure 3:
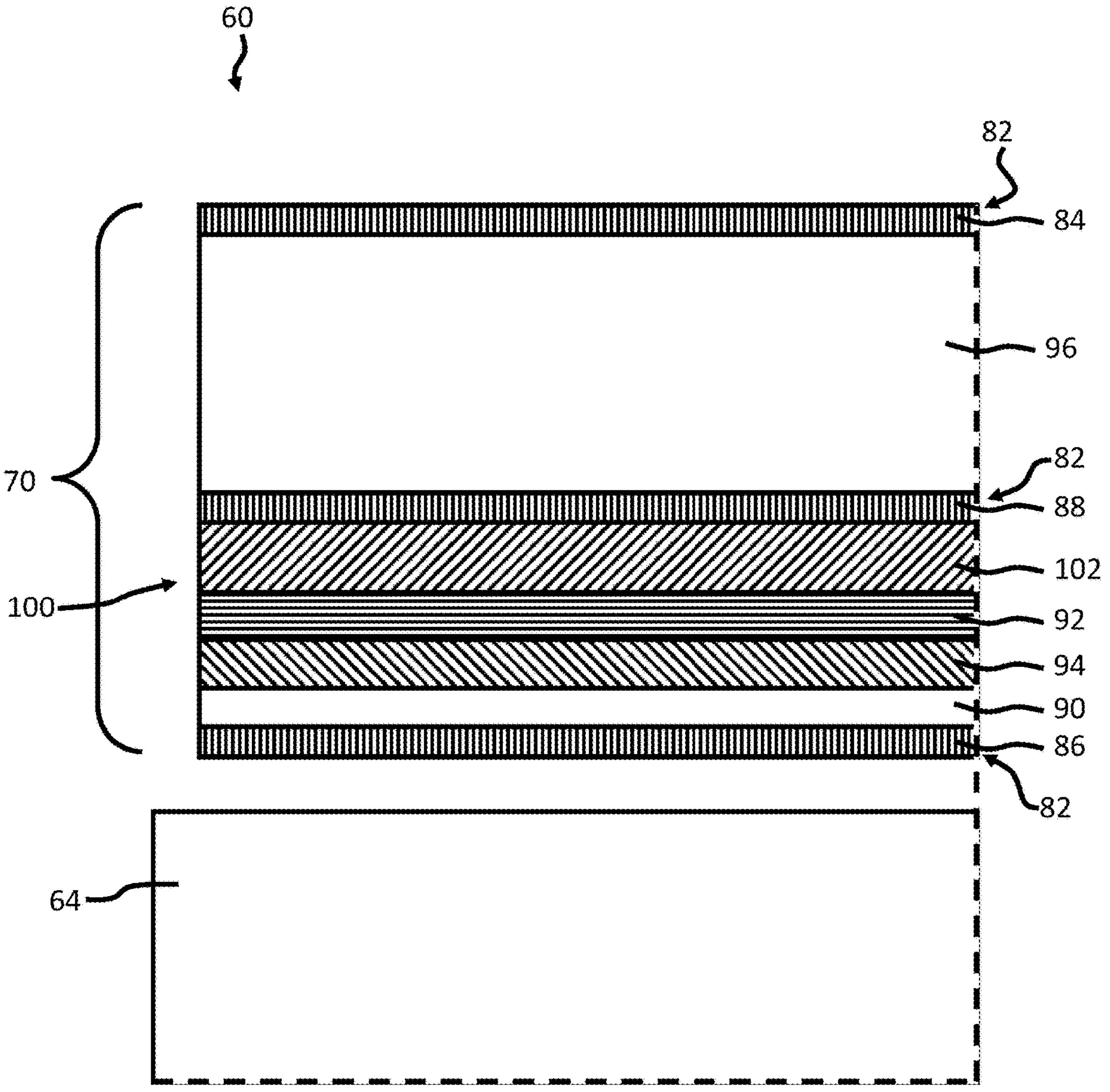
FIG. 3 is a diagram of a cross-sectional view of the FIG. 2 board assembly taken along line 3-3 in FIG. 2.
Figure 4:
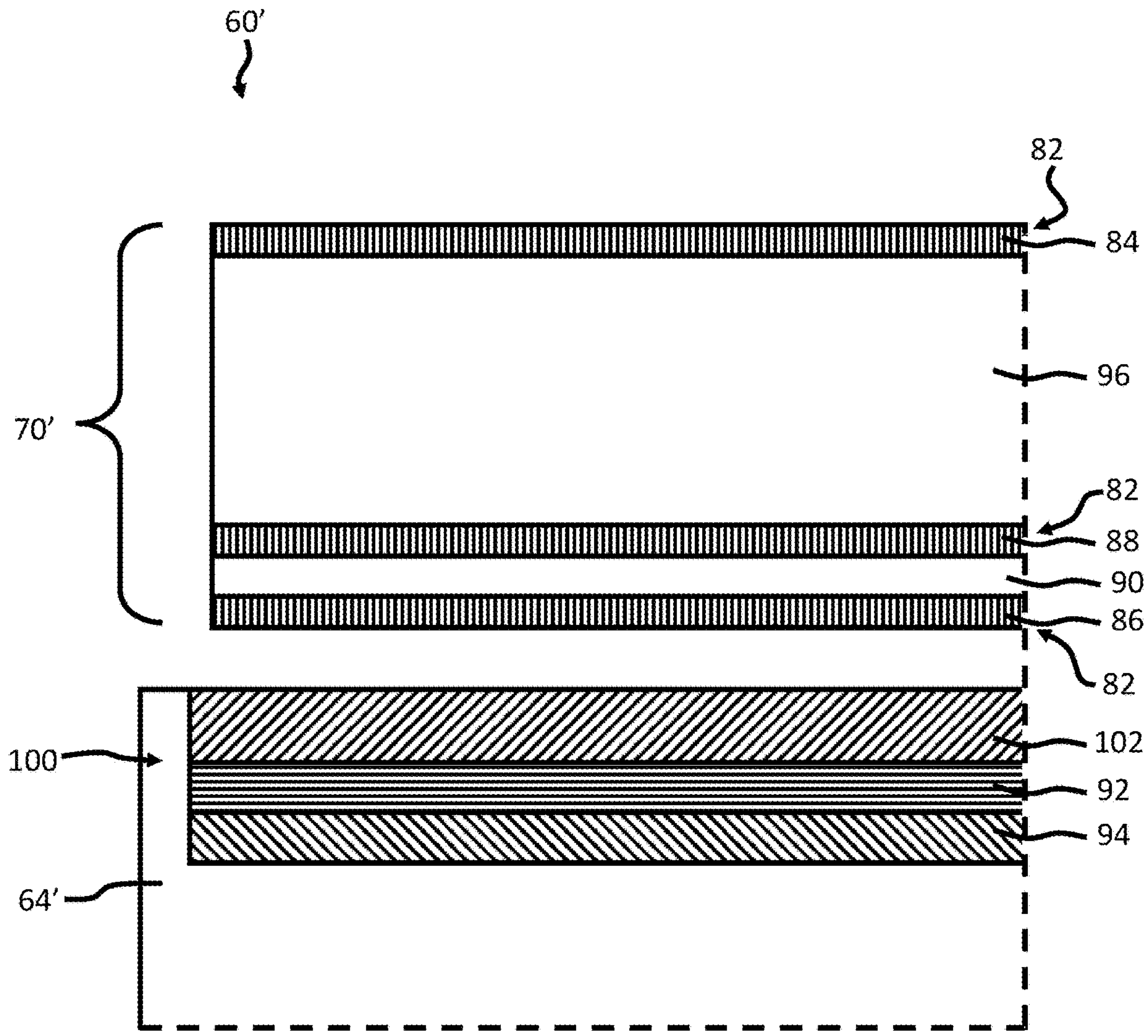
FIG. 4 is a diagram of a cross-sectional view of a second embodiment of the FIG. 2 board assembly taken along line 3-3 in FIG. 2.
Figure 5:
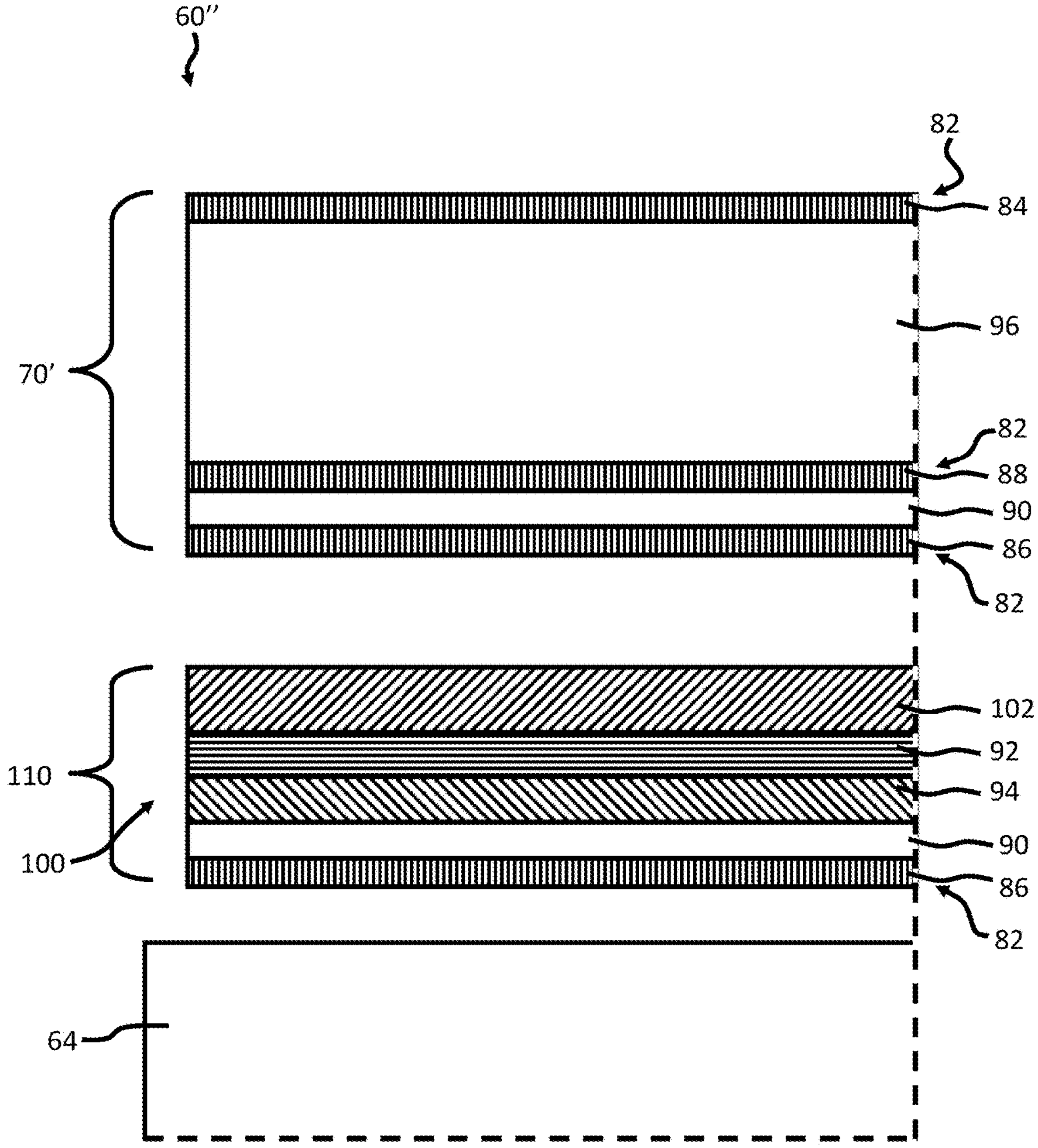
FIG. 5 is a diagram of a cross-sectional view of a third embodiment of the FIG. 2 board assembly taken along line 3-3 in FIG. 2.

FIGS. 3, 4, and 5 show diagrams of a cross-section of board assembly 60 according to various embodiments. Additional spacing is shown between different parts to emphasize that such parts are separate. However, when assembled, tape pad 70, board 64, and/or other parts are generally in direct physical contact with one another. Further, the various layers are shown for illustrational purposes, and the thicknesses of individual layers are not to scale.

As shown in FIGS. 3 through 5, tape pad 70 includes one or more adhesive layers 82 and a plastic layer 90. Typically, tape pad 70 includes multiple adhesive layers 82 in the form of a fabric adhesive 84 and a board adhesive 86. Plastic layer 90 generally provides structure for tape pad 70. Typically, plastic layer 90 is made from a flexible plastic or rubber material, such as polyethylene terephthalate (PET), polyvinyl chloride (PVC), biaxially oriented polypropylene (BOPP), or low-density polyethylene as examples. Plastic layer 90 can be transparent or translucent. Using translucent plastic can allow board 64 or another underlying layer to be visible to users when the thermochromic pigment becomes translucent. Alternatively, plastic layer 90 can be opaque and can be visible to users when the thermochromic pigment becomes translucent.

Adhesive layers 82 are generally positioned on either side of plastic layer 90. Fabric adhesive 84 can be positioned as the uppermost layer in tape pad 70. Positioning fabric adhesive 84 on the uppermost layer allows garments or other substrates to be removably attached and to the top side of tape pad 70. Generally, fabric adhesive 84 is an adhesive that can allow a user to detach a substrate and attach a new substrate afterwards. For instance, adhesive that allows a user to remove a printed t-shirt from tape pad 70 and attach a blank t-shirt. Fabric adhesive 84 can be specially adapted to adhere to a fabric substrate. For example, fabric adhesive 84 can adhere to individual fabric strands in a garment. As should be appreciated, fabric adhesive 84 could be replaced with a different type of removable adhesive that is specially adapted to adhere to another type of material.

Board adhesive 86 can be positioned as the lowest layer of tape pad 70. Board adhesive 86 allows tape pad 70 to removably attach to board 64. Board adhesive 86 can be specially adapted to adhere to printing surface 66 of board 64. In one version, board adhesive 86 is less sticky than fabric adhesive 84. However, in that version, board adhesive 86 can attach tape pad 70 to board 64 more strongly than fabric adhesive 84 attaches tape pad 70 to the substrate. Particularly, board adhesive 86 can interact with board 64 over a greater surface area than the surface area over which fabric adhesive 84 and the substrate interact. For instance, fabric adhesive 84 may adhere to multiple strands in a garment rather than a continuous surface area.

Tape pad 70 optionally includes a gel 96 positioned under fabric adhesive 84. Gel 96 supports fabric adhesive 84 to be reusable for a large number of times. Specifically, gel 96 may assist cleaning residue such as fabric lint and other debris off fabric adhesive 84 after it has been used to removably attach to substrates many times. Without sufficient adhesion, tape pad 70 may not adhere to the substrate enough to keep the substrate in place on board assembly 60 during the printing steps. In some applications, fabric adhesive 84 can be used to removable attach thousands of substrates (such as t-shirts) before fabric adhesive 84 accumulates sufficient residue that it no longer adequate. Including gel 96 may assist in operators being able to easily remove residue and extend the usable life of fabric adhesive 84.

Under gel 96, tape pad 70 optionally includes another adhesive layer 82 in the form of intermediate adhesive 88. In one version, intermediate adhesive 88 can be the same type of adhesive as fabric adhesive 84. In another version, intermediate adhesive 88 can be specialized to attach interior layers of tape pad 70. For example, intermediate adhesive 88 can be specialized to adhere to plastic, paint, gel, and/or another material used within tape pad 70. Further, intermediate adhesive 88 can be adapted to permanently attach layers within tape pad 70. As should be appreciated, the same type of adhesive could be used for fabric adhesive 84, intermediate adhesive 88, and/or board adhesive 86.

Thermochromic indicator 100 typically includes a thermochromic pigment layer 102. Thermochromic pigment layer 102 can be incorporated into tape pad 70, embedded in printing surface 66 of board 64, and/or included in a separate tape layer. As noted, thermochromic pigment layer 102 can change colors between translucent and opaque. When opaque, the thermochromic pigment contrasts with the color of board 64 and/or other colored layers in tape pad 70. When translucent, an underlying colored layer (e.g., printing surface 66 of board 64 or a layer in tape pad 70) is visible through thermochromic pigment layer 102. Thermochromic pigment layer 102 is positioned on top of such an underlying layer, either as layers within the same part or split across different parts. Thermochromic pigment layer 102 can be in the form of a paint layer, a plastic layer 90, and/or in another form. Thermochromic indicator 100 can include multiple layers of thermochromic paint. In one example, thermochromic indicator 100 includes multiple layers of the same type of thermochromic paint.

Thermochromic indicator 100 optionally includes a first opaque layer 92 and a second opaque layer 94. Opaque layers 92 and 94 can comprise paint, colored plastic, and/or be included in another form. Opaque layers 92 and 94 are generally opaque so as to reflect and/or absorb all or a majority of incoming light. Using opaque layers 92 and 94 can help tape pad 70 contrast with board 64, which may assist operators when applying or removing tape pad 70 from board 64. First opaque layer 92 is generally positioned on top of second opaque layer 94. In one example, first opaque layer 92 is a different color from the color of printing surface 66 on board 64. Second opaque layer 94 can be white and/or another color. For instance, second opaque layer 94 can be a primer layer that helps first opaque layer 92 to contrast better with board 64 and/or to better adhere to a material.

As noted, the thickness of the various layers are not necessarily shown to scale. In one embodiment, the thickness of gel 96 is approximately twenty times the thickness of plastic layer 90. As examples, gel 96 can be approximately 0.5, 1, or 2 millimeters thick, and plastic layer 90 can be approximately 1, 2, or 4 thousandths of an inch (mils). Opaque layers 92 and 94 and/or thermochromic pigment layer 102 can be approximately 1 mil, 2 mils, 5 mils, and/or another thickness. In one version, thermochromic pigment layer 102 can be five times as thick as first and/or second opaque layers 92 and 94. For instance, thermochromic pigment layer 102 can comprise five coats of paint while first and/or second opaque layer 92 and 94 comprise a single coat of paint.

Referring to FIG. 3, one embodiment of board assembly 60 incorporates thermochromic indicator 100 into tape pad 70. Incorporating thermochromic indicator 100 into tape pad 70 can support simple installation of thermochromic indicator 100 onto board 64. For example, thermochromic indicator 100 can be installed simply by applying tape pad 70. Such a tape pad 70 can allow operators of printing system 50 to use existing boards 64.

In the FIG. 3 embodiment, tape pad 70 includes thermochromic pigment layer 102. Further, tape pad 70 can include first and second opaque layers 92 and 94. First and second opaque layers 92 and 94 can be positioned on top of plastic layer 90 within tape pad 70. In one example, second opaque layer 94 can help first opaque layer 92 attach to plastic layer 90 within tape pad 70. In some versions, tape pad 70 can omit first opaque layer 92 and/or second opaque layer 94. In such versions, printing surface 66 of board 64 can be colored differently, display words, and/or display symbols to indicate temperature change when thermochromic layer becomes translucent.

Referring to FIG. 4, another embodiment of board assembly 60' incorporates thermochromic indicator 100 into board 64'. Incorporating thermochromic indicator 100 into board 64' can allow operators to replace tape pad 70' while retaining thermochromic indicator 100 with board assembly 60. Similar to the FIG. 3 embodiment, an operator only needs to apply tape pad 70 to board 64 when preparing board assembly 60.

As shown, thermochromic pigment layer 102 and/or opaque layers 92 and 94 can be embedded in an upper portion of board 64', be permanently applied to printing surface 66 of board 64', and/or be incorporated on board 64' in another way. In one example, thermochromic pigment layer 102 and/or opaque layers 92 and 94 can be painted onto board 64'. In another example, thermochromic pigment layer 102 and/or opaque layers 92 and 94 can be in the form of an inlay that is embedded in board 64'. Tape pad 70' omits first opaque layer 92 and/or second opaque layer 94. When thermochromic indicator 100 is included in board 64, tape pad 70' may include just adhesive layers 82, plastic layer 90, and optionally gel 96, with each layer of tape pad 70' being translucent or transparent such that thermochromic indicator 100 and opaque layer 92 are visible through tape pad 70'.

Referring to FIG. 5, another embodiment of a board assembly is illustrated as board assembly 60''. Board assembly 60'' includes a thermochromic sheet 110 that is separate from tape pad 70' and board 64. All or part of thermochromic indicator 100 can be incorporated into thermochromic sheet 110. Using a distinct thermochromic sheet 110 can allow operators to utilize existing stock of tape pads 70' and/or other adhesives as well as utilizing existing boards 64. In one version, thermochromic sheet 110 includes thermochromic pigment layer 102, plastic layer 90, and adhesive layer 82. Adhesive layer 82 in thermochromic sheet 110 can be adhesive 86. Thermochromic sheet 110 is generally applied to board 64 between board 64 and tape pad 70'. Thermochromic sheet 110 optionally includes first and/or second opaque layers 92 and 94.

Figure 6:
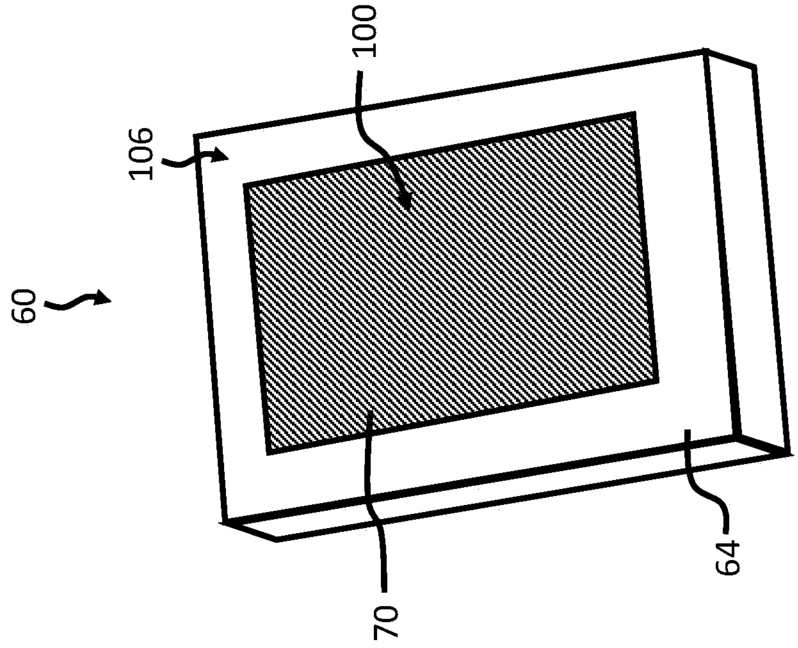
FIG. 6 is a perspective view of the FIG. 2 board assembly with a thermochromic indicator in an opaque state.
Figure 7:
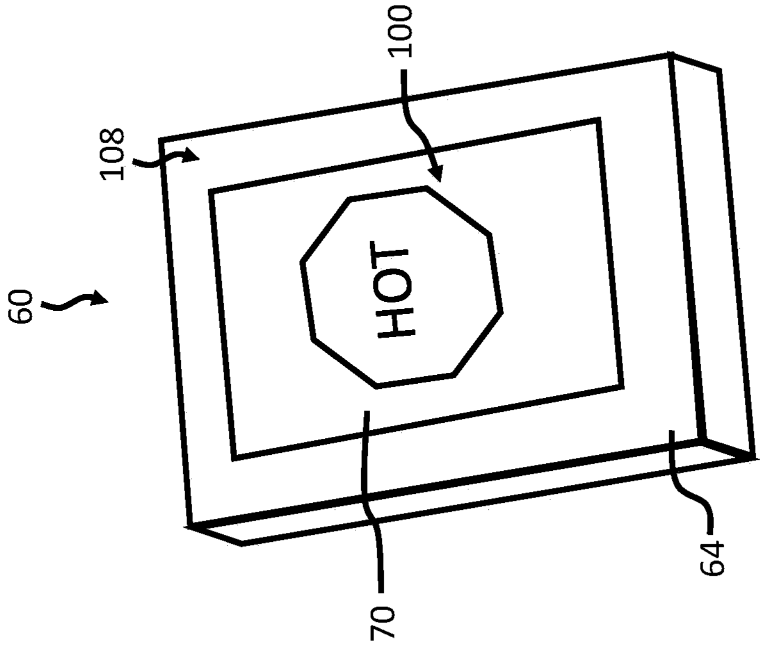
FIG. 7 is a perspective view of the FIG. 7 board assembly with the thermochromic indicator in a translucent state.

Referring to FIGS. 6 and 7, thermochromic indicator 100 can transition between an opaque state 106 and a translucent state 108. In one embodiment, thermochromic indicator 100 is in opaque state 106 at a lower temperature and in translucent state 108 at a higher temperature. Thermochromic indicator 100 typically transitions between opaque and translucent states 106 and 108 near or exactly at a target temperature. In one version, the target temperature is a lower temperature limit for ideal ink application onto a substrate, such as a shirt or other garment. For instance, the target temperature can be 120 degrees F. The target temperature can depend on the type of ink used, the type of printing device, the type of substrate, and/or other factors. In some printing settings, ink may start to cure partially at 120 degrees F., and different layers of ink may not cure onto the substrate properly if the temperature falls below 120 degrees F.

As shown in FIG. 6, thermochromic indicator 100 can appear as a uniform opaque color when in opaque state 106. The opaque color can be a color that traditionally indicates a neutral condition, such as white, blue, yellow, green and/or another color. In one example, thermochromic indicator 100 can appear as a solid color with no text or symbols. Alternatively, thermochromic indicator 100 can display text and/or symbols that indicate cold printing conditions when in opaque state 106. The appearance of board assembly 60 generally indicates unfavorable working conditions to operators when thermochromic indicator 100 is in opaque state 106.

As shown in FIG. 7, thermochromic indicator 100 changes the appearance of board assembly 60 when transitioning to translucent state 108. In translucent state 108, thermochromic indicator 100 can allow board assembly 60 to display a different solid color, text, and/or symbols that indicate a favorable change in working conditions. Typically, such conditions are a temperature of board assembly 60 and/or the substrate is above the desired minimum temperature. Such coloring, text, and/or symbols can be on the underlying opaque layers 92 and 94 and/or board 64. In one example, thermochromic indicator 100 can reveal a uniform opaque color that traditionally indicates heat, such as red, orange, yellow, black, and/or another color. Thermochromic indicator 100 can reveal text that says “HOT”, “WARNING”, “CAUTION”, and/or other words. In one example, board assembly 60 can display the target temperature and/or an explanation of the favorable conditions when thermochromic indicator 100 is in translucent state 108.

Figure 8:
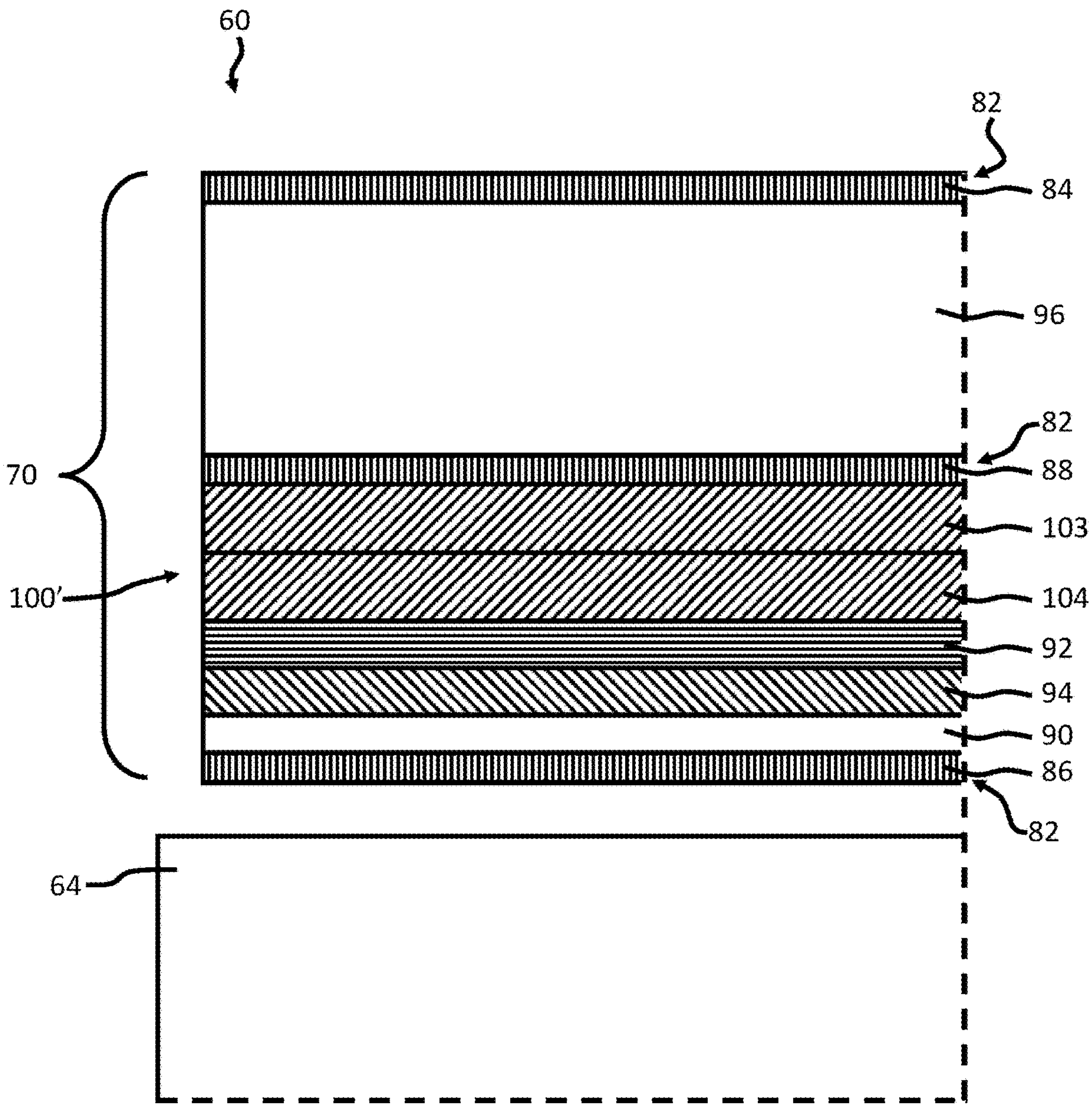
FIG. 8 is a diagram of a cross-sectional view of a fourth embodiment of the FIG. 2 board assembly taken along line 3-3 in FIG. 2.
Figure 10:
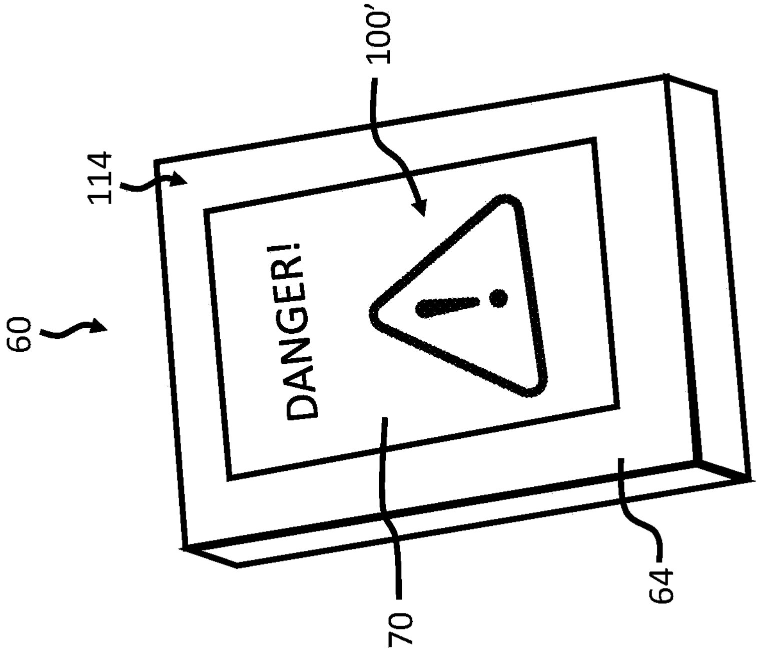
FIG. 10 is a perspective view of the FIG. 8 board assembly in a second translucent state.
Figure 9:
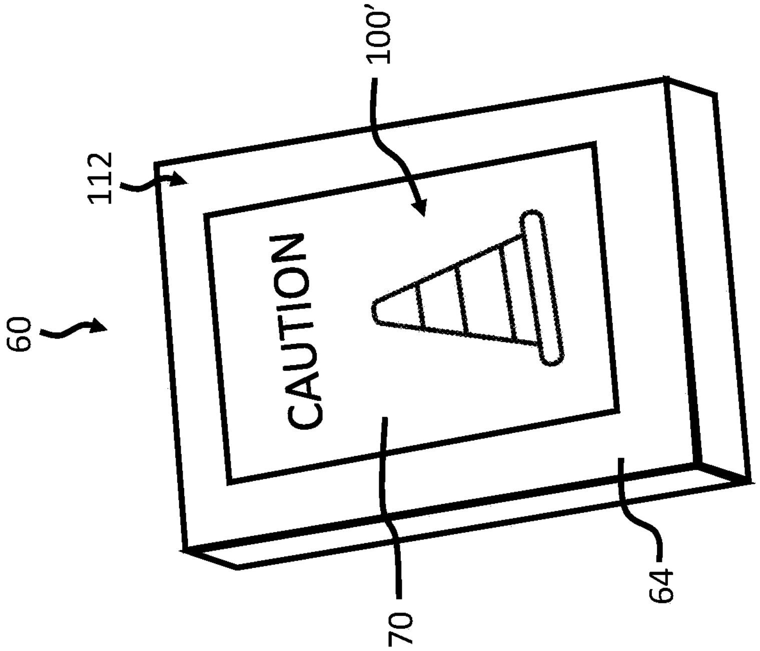
FIG. 9 is a perspective view of the FIG. 8 board assembly in a first translucent state.

FIGS. 8, 9, and 10 illustrate an alternate embodiment of thermochromic indicator 100'. As shown in FIG. 8, thermochromic indicator 100' can include a first thermochromic pigment layer 103 and a second thermochromic pigment layer 104. Using two thermochromic pigments can allow thermochromic indicator 100' to notify an operator of the condition of board assembly 60 at different temperatures. First thermochromic pigment layer 103 can become transparent at a lower temperature than second thermochromic pigment layer 104. First thermochromic pigment layer 103 can be positioned on top of second thermochromic pigment layer 104. Such an arrangement of thermochromic pigment layers 103 and 104 can allow board assembly 60 to reveal different colors and/or messages on multiple underlying layers at different temperatures.

In the FIG. 8 example, first and second thermochromic pigment layers 103 and 104 can be incorporated into tape pad 70. The construction of tape pad 70 in FIG. 8 can be similar to that of tape pad 70 in FIG. 3, except for the addition of second thermochromic pigment layer 104. In another example, first and second thermochromic pigment layers 103 and 104 can be incorporated into board 64. In yet another example, first and second thermochromic pigment layers 103 and 104 can be incorporated into one or more thermochromic sheets 110. One thermochromic sheet 110 can include first thermochromic pigment layer 103, and another thermochromic sheet 110 can include second thermochromic pigment layer 104. Such an arrangement can allow users to customize the transition temperatures and/or the display messages for thermochromic indicator 100'.

FIGS. 9 and 10 illustrate thermochromic indicator 100' transitioning between multiple translucent states 108. In FIG. 9, thermochromic indicator 100' is in a first translucent state 112. In first translucent state 112, first thermochromic pigment layer 103 can become translucent while second thermochromic pigment layer 104 can remain opaque. Thermochromic indicator 100 can transition to first translucent state 112 from opaque state 106 when the temperature exceeds 120 degrees F. or at another temperature. For example, first translucent state 112 can indicate a temperature that is the desired minimum for printing onto substrates. In first translucent state 112, thermochromic indicator 100' can reveal a solid color, a pattern, text, and/or symbols to indicate the desired temperature has been reached to operators. For instance, board assembly 60 can appear yellow, orange, and/or another color. The text and/or symbols can indicate a mild degree of caution for handling by operators.

In FIG. 10, thermochromic indicator 100' is in a second translucent state 114. In second translucent state 114, both first and second thermochromic pigment layers 103 and 104 can be translucent. First thermochromic pigment layer 103 can remain translucent if the temperature rises beyond the first transition temperature. Second thermochromic pigment layer 104 can become translucent at a second transition temperature, such as 180 degrees F. or another temperature. Second translucent state 114 can indicate a temperature that is too hot for printing operation and/or not safe for operators to touch. For example, the second transition temperature may pose a risk for burning the operator and/or melting part of the substrate and/or damaging the ink. In second translucent state 114, thermochromic indicator 100' can reveal another solid color, pattern, text, and/or symbols which indicate a higher level of warning to operators compared to first translucent state 112. For instance, board assembly 60 can appear red, black, orange, and/or another color. The text and/or symbols can indicate a serious danger or warning to operators. Further, the text and/or symbols can explain to operators to keep themselves and the substrate away from board assembly 60 until board assembly 60 cools below the temperature threshold.

While the present disclosure has been illustrated and described in detail in the drawings and foregoing description, the same is to be considered as illustrative and not restrictive in character, it being understood that a preferred embodiment has been shown and described and that all changes, equivalents, and modifications that come within the spirit of the claimed invention defined by following claims are desired to be protected.

The language used in the claims and the written description and in the above definitions is to only have its plain and ordinary meaning, except for terms explicitly defined above. Such plain and ordinary meaning is defined here as inclusive of all consistent dictionary definitions from the most recently published (on the filing date of this document) general purpose Merriam-Webster dictionary.

I claim:

1. A tape used with a printing board adapted to receive a printable medium, wherein the printing board defines a printing surface, the tape comprising:

a flexible plastic sheet comprising a top side and a bottom side, wherein the flexible plastic sheet is sized to cover nearly all of the printing surface of the printing board;

a first adhesive on the bottom side of the flexible plastic sheet and on a bottom outer surface of the tape, wherein the first adhesive is configured to directly or indirectly secure the tape onto the printing board;

a first thermochromic pigment layer, wherein, when the first thermochromic pigment layer is below a first temperature, the first thermochromic pigment layer is opaque and has a first appearance, and wherein, when the first thermochromic pigment layer is above the first temperature, the first thermochromic pigment layer is translucent or transparent; and a second adhesive on the top side of the flexible plastic sheet and on a top outer most surface of the tape.

2. The tape of claim 1, further comprising an opaque layer positioned below the first thermochromic pigment layer, wherein the opaque layer has a second appearance that is visually distinguishable from the first appearance, and wherein the first thermochromic pigment layer is positioned on top of the printing surface such that the first thermochromic pigment layer obscures the second appearance when the first thermochromic pigment layer is below the first temperature.

3. The tape of claim 1, wherein the flexible plastic sheet is translucent or transparent.

4. The tape of claim 1, wherein the flexible plastic sheet is opaque with a second appearance that is visually distinguishable from the first appearance.

5. The tape of claim 1, further comprising a gel layer.

6. The tape of claim 5, wherein the gel layer is translucent or transparent.

7. The tape of claim 1, wherein the second adhesive is configured to releasably secure the printable medium onto the printing board via the tape.

8. The tape of claim 1, wherein the first temperature is approximately 120 degrees F.

9. The tape of claim 1, further comprising a second thermochromic pigment layer, wherein, when the second thermochromic pigment layer is below a second temperature, the second thermochromic pigment layer is opaque and has a third appearance that is visually distinguishable from the first appearance, wherein, when the second thermochromic pigment layer is above the second temperature, the second thermochromic pigment layer is translucent or transparent and wherein the second temperature is higher than the first temperature.

10. The tape of claim 9, wherein the second temperature is approximately 180 degrees F.

11. A method of screen printing printable mediums with a screen printer that comprises printing boards and a heating station, the method comprising:

applying the tape of claim 1 onto the printing boards;

activating the screen printer;

heating the printing boards with the heating station;

monitoring the visual appearance of the printing boards;

when the first appearance is visible, continue heating the printing boards with the heating station without applying printable mediums to the printing boards; and when the second appearance is visible, securing printable mediums onto the printing boards and printing onto the printable mediums using the screen printer.

12. A method of screen printing printable mediums with a screen printer that comprises printing boards and a heating station, the method comprising:

applying the tape of claim 9 onto the printing boards;

activating the screen printer;

heating the printing boards with the heating station;

monitoring the visual appearance of the printing boards;

when the first appearance is visible, continue heating the printing boards with the heating station without applying printable mediums to the printing boards;

when the second appearance is visible, securing printable mediums onto the printing boards and printing onto the printable mediums using the screen printer; and when the third appearance is visible, turning off the heating station.

13. The tape of claim 1, wherein the tape covers at least 90% of the printing surface of the printing board.

* * * * *